Figure 1:
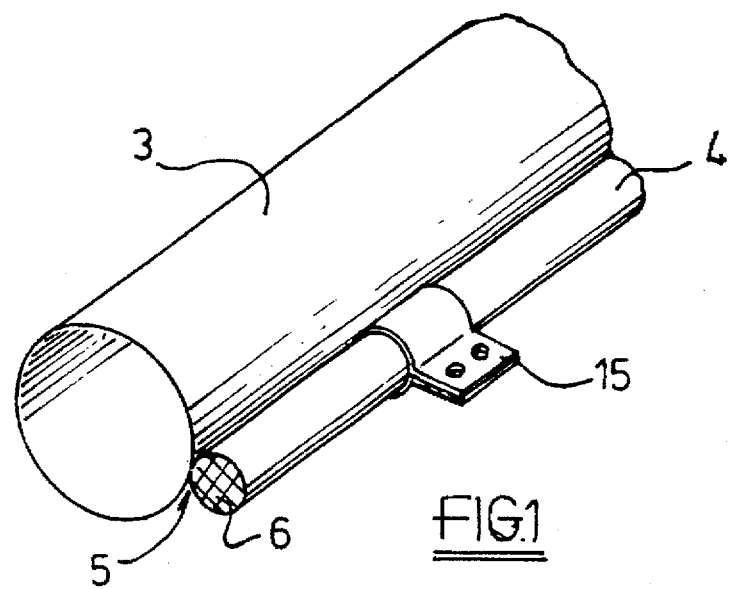

United States Patent [19]
van Wassenhove

[11] Patent Number: 5,664,607
[45] Date of Patent: Sep. 9, 1997

[54] TEXTILE BRAIDS

[75] Inventor: Denis van Wassenhove, Crepy-en-Valois, France

[73] Assignee: Bentley-Harris S.A., Crepy-en-Valois, France

[21] Appl. No.: 669,340
[22] PCT Filed: Feb. 3, 1995
[86] PCT No.: PCT/IB95/00102
§ 371 Date: Jul. 3, 1996
§ 102(e) Date: Jul. 3, 1996
[87] PCT Pub. No.: WO95/21451
PCT Pub. Date: Aug. 10, 1995

[30] Foreign Application Priority Data

Feb. 5, 1994 [GB] United Kingdom ............... 9402231

[51] Int. Cl.$^6$ .................................................. F16L 11/02
[52] U.S. Cl. ..................... 138/107; 138/115; 138/111; 248/49; 248/61
[58] Field of Search ............................. 138/107, 111, 138/115, 103, 106, 123; 248/49, 61, 75, 58–60

[56] References Cited

U.S. PATENT DOCUMENTS

| | | | |
|---|---|---|---|
| 1,261,008 | 4/1918 | Braly | 138/107 |
| 1,596,418 | 8/1926 | Evans | 138/107 |
| 1,635,957 | 7/1927 | Richardson | 138/107 |
| 2,012,108 | 8/1935 | Raney | 138/107 X |
| 2,013,724 | 9/1935 | Brady | 138/107 |
| 3,885,593 | 5/1975 | Koerber et al. | 138/107 X |
| 4,600,146 | 7/1986 | Ohno | 138/115 X |
| 5,064,970 | 11/1991 | Bennett et al. | 138/128 X |
| 5,178,923 | 1/1993 | Andrieu et al. | 428/36.1 |
| 5,226,456 | 7/1993 | Semak | 138/107 |
| 5,300,337 | 4/1994 | Andrieu et al. | 428/36.1 |

FOREIGN PATENT DOCUMENTS

| | | | |
|---|---|---|---|
| 1542829 | 10/1968 | France | 138/107 |
| 1232996 | 5/1971 | United Kingdom | 138/107 |
| 2032044 | 4/1980 | United Kingdom | 138/107 |

*Primary Examiner*—Patrick Brinson
*Attorney, Agent, or Firm*—Synnestvedt & Lechner

[57] ABSTRACT

A generally tubular textile braid is divided into two axially extending portions by stitching or otherwise securing opposed wall portions of said braid together, one of said portions being adapted to receive a wiring harness and the other containing an axially extending reinforcement constituted by a second tubular braid of the same or a different textile material, the two braids being formed with the same or very similar braiding angles, so that on radial expansion of the first portion to install it over a substrate such as a wiring harness assembly, both axially extending portions and the reinforcement contract by substantially the same amount in an axial direction.

2 Claims, 1 Drawing Sheet

TEXTILE BRAIDS

This invention relates to braided textile tubes of the kind commonly used for shielding and/or protecting bundles of wires and/or cables. Such products are typically used to enclose the wiring harness in motor vehicles. The braid containing the wiring harness is secured to the body of the vehicle by clips, cords or plastics straps in order to minimise vibration and the possibility of noise caused by such vibration. The braid must be radially expandable in order to facilitate installation over the parts of a wiring harness. It must also be strong enough to support the harness.

It is an object of the present invention to provide a textile braid which is both radially expandable and at the same time strong enough to fully support the harness and retain it firmly against a substrate such as the inside wall of an engine compartment.

According to this invention a generally tubular textile braid is divided into two axially extending portions by stitching or otherwise securing opposed wall portions of said braid together, one of said portions being adapted to receive a wiring harness and the other containing an axially extending reinforcement constituted by a second tubular braid of the same or a different textile material, the two braids being formed with the same or very similar braiding angles, so that on radial expansion of the first portion to install it over a wiring harness assembly, both axially extending portions and the reinforcement contained within one of them contract by substantially the same amount in an axial direction.

By using a braid of the kind just recited, it is possible to install a protective sleeve over a wiring harness, including plugs and/or connectors, without displacing the reinforcement. Because the latter does not have to be secured to the braid by stitching, manufacture is relatively simple and can be carried out in a single operation. By choosing the relative sizes (diameters) of the axially extending portions, together with the size of the reinforcing braid, it is possible to produce a product which can be attached to a substrate only by the second, reinforced portion, so that there is no need to secure the entire assembly. Thus the reinforced portion can be stapled to a wall, or engaged in a row of hooks or pins without any risk of the latter also engaging or damaging a wiring harness inside the first portion.

Figure 2:
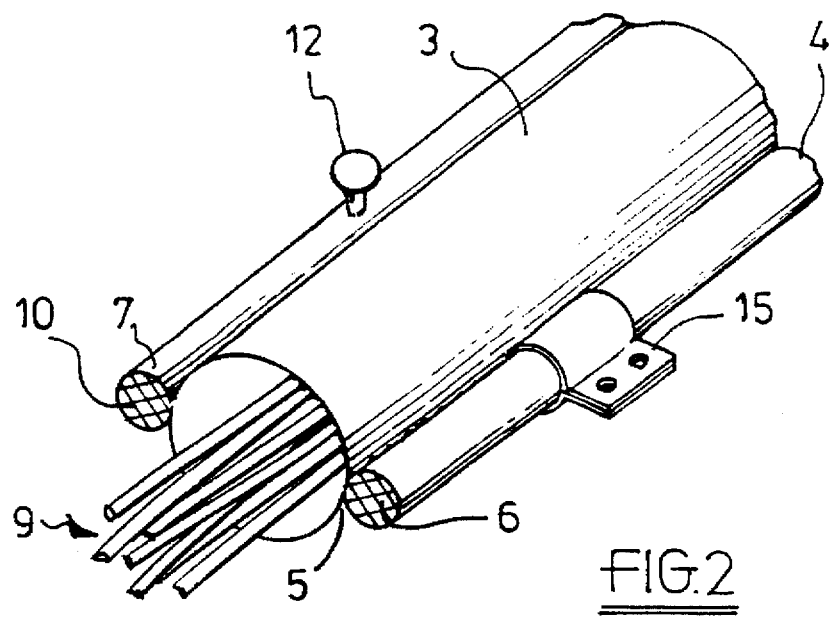

In order that the invention be better understood preferred embodiments of it will now be described by way of example with reference to the accompanying drawing in which FIG. 1 is a schematic view of braid according to this invention and FIG. 2 is another braid according to this invention. For convenience, common reference numerals are used in both Figures.

In FIG. 1, a tubular braid is divided into two unequally sized axially extending portions 3, 4 by a row of axially extending stitches (not seen, but indicated at 5). The smaller diameter portion 4 contains a second tubular braid 6, inserted during manufacture of the braid 1. Both braids were made from a mixture of strong monofilament and multifilament yarns; in this case polyester material was used. The same braiding angle of about 45° was used to ensure good radial expandability for the larger diameter portion 3, so it could be readily installed over a wiring harness (for example, as shown at 9 in FIG. 2). Because the same braiding angles were used, the axial forces due to expansion caused both braids to contract axially by the same amount, so that after installation, the end regions of the portion 4 were still fully reinforced, without any need to otherwise anchor/secure the reinforcing braid 6 inside portion 4.

The assembly was strong enough to withstand attachment to a substrate by clips 15 attached only to the second, reinforced portion.

In FIG. 2, the structure of FIG. 1 is modified by providing a second axially extending reinforced portion 7, corresponding to the smaller diameter portion 4 described above, but located on the opposite side of the portion 3 and containing its own reinforcing braid 10. This construction is suitable for heavy duty applications; it can be secured along both edges by clips 15 or staples 12, as appropriate.

I claim:

1. A generally tubular, radially expandable textile braid divided into first and second axially extending tubular portions, said first tubular portion being adapted to receive a wiring harness, a first textile braided reinforcement element extending axially within said second axially extending tubular portion, said generally tubular braid being constructed to allow for radial expansion upon axial contraction, said radially expandable textile braid and said first textile braided reinforcement element having substantially the same braid angles so that on radial expansion of the first portion, both axially extending portions and the reinforcement element contract axially by substantially the same amount.

2. A braid according to claim 1 provided with a third axially extending tubular portion located diametrically opposite the second tubular portion, a second textile braided reinforcement element extending axially within said third axially extending tubular portion, said second braided reinforcement element and said third axially extending portion having substantially the same braiding angle as said first and second axially extending portions and said first braided reinforcement element.

* * * * *